(12) United States Patent
Lee

(10) Patent No.: US 6,290,898 B1
(45) Date of Patent: Sep. 18, 2001

(54) APPARATUS FOR HEAT TREATMENT OF IMPACT BEAMS FOR USE IN AUTOMOBILES

(75) Inventor: Eun Woo Lee, Taegu-si (KR)

(73) Assignee: Dongwonmetal Ind. Co., Ltd. (KR)

( * ) Notice: Subject to any disclaimer, the term of this patent is extended or adjusted under 35 U.S.C. 154(b) by 0 days.

(21) Appl. No.: 09/550,921

(22) Filed: Apr. 17, 2000

(30) Foreign Application Priority Data

Oct. 6, 1999 (KR) .................................................. 99-21415

(51) Int. Cl.[7] .................................................. C21D 9/62
(52) U.S. Cl. .................................................. 266/104; 266/252
(58) Field of Search .................................................. 266/104, 113, 266/252; 148/520

(56) References Cited

U.S. PATENT DOCUMENTS 5,487,795 * 1/1996 Kim et al. .................................................. 148/520
5,653,937 * 8/1997 Kim et al. .................................................. 266/104

* cited by examiner

*Primary Examiner*—Scott Kastler
(74) *Attorney, Agent, or Firm*—Cooper & Dunham LLP

(57) ABSTRACT

An apparatus for heat treatment of impact beams for use in automobiles is disclosed. This apparatus uniformly heat-treats impact beams having a non-circular cross-section, such as an elliptical cross-section. The apparatus of the present invention comprises a step feeder, a conveying unit, a guide unit, an impact beam rotating and moving unit, a heat-treating unit, a cooling unit and feed rollers. The impact beam rotating and moving unit consists of a rotary drum and a plurality of support rolls. This rotary drum cooperates with the support rolls to move the impact beams from the guide unit to a heat-treating unit. Each of the support rolls has a tapered profile. The heat-treating unit is used for heating the impact beams from the rotating and moving unit to the center of the induction coil so as to allow the impact beams to pass through the center of the induction coil.

1 Claim, 4 Drawing Sheets

APPARATUS FOR HEAT TREATMENT OF IMPACT BEAMS FOR USE IN AUTOMOBILES

BACKGROUND OF THE INVENTION

1. Field of the Invention

The present invention relates, in general, to an apparatus for heat treatment of impact beams for use in automobiles and, more particularly, to an improvement in such an apparatus to uniformly and effectively heat-treat impact beams having a non-circular cross-section, such as an elliptical cross-section, in addition to impact beams having a circular cross-section.

2. Description of the Prior Art

As well known to those skilled in the art, impact beams are installed in the interior of doors of automobiles so as to reduce damage or deformation of the doors caused by external impact in the case of collision of the automobiles against something else and thereby to protect passengers from such external impact.

In order to allow such impact beams to have desired structural properties, such as desired impact resistance and desired impact absorptive power, without increasing weight of the chassis of automobiles, the impact beams have been typically produced by appropriately processing, such as heat-treating, hollow metal tubular members having a circular cross-section. In recent days, another type of impact beam having a non-circular cross-section, such as an elliptical cross-section capable of improving the structural strength and impact resistance of the impact beam, has been proposed and used.

In order to continuously produce such impact beams through a mass production process while accomplishing desired productivity, a plurality of impact beams, having the same dimension, are unidirectionally and continuously conveyed to a desired position using an appropriate conveying means, such as a chain conveyor. During such a unidirectional and continuous conveying process, the impact beams are continuously heat-treated through an induction heating process. In such an induction heating process, the impact beams pass through the center of an annular induction coil at a constant speed.

Therefore, conventional apparatuses for heat treatment of impact beams are designed to horizontally convey the impact beams while allowing the impact beams to pass through the center of an annular induction coil. Such conventional heat treatment apparatuses somewhat effectively accomplish a desired uniform heat-treating effect in the case of impact beams having a circular cross-section since the circular cross-section of the impact beams agree with the profile of the annular induction coil. However, the conventional heat treatment apparatuses are problematic in that they fail to uniformly heat impact beams having a non-circular cross-section, such as an elliptical cross-section. That is, even when the impact beams, having such a non-circular cross-section, precisely pass through the center of the annular induction coil of an apparatus, the impact beams fail to be uniformly heated by the induction coil due to a difference in distance between the external surface of each impact beam and the annular induction coil. In such a case, the resulting impact beams, having a non-circular cross-section, may be undesirably reduced in structural strength in addition to flexural deformation.

SUMMARY OF THE INVENTION

Accordingly, the present invention has been made keeping in mind the above problems occurring in the prior art, and an object of the present invention is to provide an apparatus for heat treatment of impact beams for use in automobiles, which is designed to uniformly and effectively heat-treat impact beams having a non-circular cross-section, such as an elliptical cross-section, in addition to impact beams having a circular cross-section.

In order to accomplish the above object, the present invention provides an apparatus for heat treatment of impact beams for use in automobiles, comprising: a step feeder carrying a plurality of impact beams thereon and orderly and continuously feeding the impact beams in a predetermined direction; a conveying unit and a guide unit, both being orderly positioned in back of the step feeder and being used for orderly, horizontally and continuously moving and guiding the impact beams from the step feeder in the direction at a constant speed; an impact beam rotating and moving unit positioned at the outlet end of the guide unit and consisting of a rotary drum and a plurality of support rolls, the rotary drum cooperating with the support rolls to orderly and continuously move the impact beams from the guide unit in the direction, each of the support rolls having a tapered profile; and a heat-treating unit positioned at the outlet end of the impact beam rotating and moving unit, the heat-treating unit being used for heating the impact beams using an annular induction coil while guiding the impact beams from the rotating and moving unit to the center of the induction coil so as to allow the impact beams to pass through the center of the induction coil.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
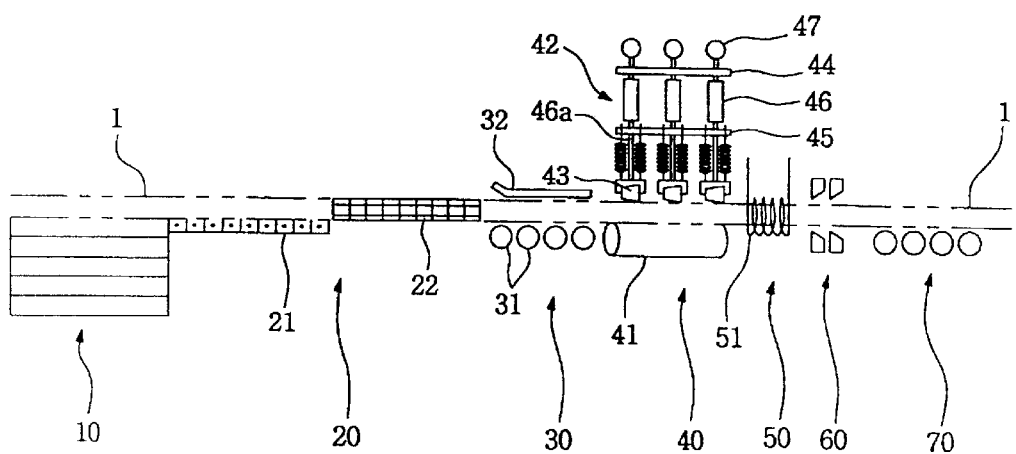
FIG. 1 is a view, schematically showing the construction of a heat treatment apparatus for impact beams in accordance with the preferred embodiment of the present invention.

FIG. 1 is a view, schematically showing the construction of a heat treatment apparatus for impact beams in accordance with the preferred embodiment of this invention.

As shown in the drawing, the heat treatment apparatus of this invention comprises a step feeder 10, an impact beam conveying unit 20, an impact beam guide unit 30, an impact beam rotating and moving unit 40 and a heat-treating unit 50. The step feeder 10 carries a plurality of impact beams 1 thereon and orderly and continuously feeds the impact beams 1, having the same dimension, to the conveying unit 20. The impact beam conveying unit 20 consists of two chain conveyors 21 and 22 and horizontally and continuously moves the impact beams 1 from the step feeder 10 to a desired position at a constant speed. The impact beam guide unit 30 is positioned at the outlet end of the second chain conveyor 22 and consists of a plurality of guide rollers 31 and a guider 32. This guide unit 30 guides the impact beams 1 so as to allow the impact beams 1 to be smoothly moved to the impact beam rotating and moving unit 40 without being interfered with each other or being brought into frictional contact with each other or being displaced from a predetermined position. The impact beam rotating and moving unit 40, positioned at the outlet end of the impact beam guide unit 30, rotates and moves the impact beams 1 using two parallely arranged rotary drums 41 in addition to a support means 42. The above support means 42 is positioned above the rotary drums 41. On the other hand, the heat-treating unit 50 is positioned at the outlet end of the impact beam rotating and moving unit 40. The above heat-treating unit 50 heats the impact beams 1 using an annular induction coil 51 while guiding the impact beams 1 from the impact beam rotating and moving unit 40 to the center of the induction coil 51. In the above heat treatment apparatus, the support means 42 of the impact beam rotating and moving unit 40 comprises a plurality of tapered support rolls 43, which support the upper surfaces of the impact beams 1 carried on the rotary drums 41.

The above heat treatment apparatus of this invention also has a conventional cooling unit 60 at a position after the heat-treating unit 50. A plurality of impact beam feed rollers 70 are regularly arranged at the outlet end portion of the apparatus so as to feed the resulting impact beams from the apparatus to a desired place.

In the impact beam rotating and moving unit 40, the support means 42 comprises a plurality of pneumatic cylinders 46 arranged between two frames, or upper and lower frames 44 and 45. The tapered support rolls 43 are movably held at a position under the lower frame 45 and are respectively connected to the actuating arms 46a of the pneumatic cylinders 46, and so the rolls 43 are appropriately biased by the actuating arms 46a downwardly. The above support rolls 43 thus pressurize and hold the upper surfaces of the impact beams 1 with appropriate pressure while the impact beams 1 are rotated and moved on the rotary drums 41. Each of the support rolls 43 has a tapered profile, in which the diameter of each roll 43 is linearly enlarged in a direction from the impact beam inlet to outlet ends of the apparatus, with the impact beam inlet end being positioned at the left-hand side of the drawing and the outlet end being positioned at the right-hand side. An air gauge 47 is provided at the top end of each of the pneumatic cylinders 46 for allowing a user to regulate the air pressure within each pneumatic cylinder 46 as desired so as to accomplish a desired pneumatic pressure for an associated support roll 43.

In an operation of the above heat treatment apparatus, a plurality of impact beams 1 are orderly and continuously fed to the first and second chain conveyors 21 and 22 of the conveying unit 20 by the step feeder 10 and are moved to the impact beams rotating and moving unit 10 by both the conveying unit 20 and the guide unit 30. When the impact beams 1 reach the impact beam rotating and moving unit 40, they are rotated in a direction while being moved to the heat-treating unit 50 by the rotating force of the two parallely arranged rotary drums 41. In such a case, the impact beams 1 are supported on the two rotary drums 41 at their lower surfaces and are appropriately pressurized by the support rolls 43 of the support means 42 at their upper surfaces. The impact beams 1 thus orderly pass through the center of the annular induction coil 51 of the heat-treating unit 50 while being heat-treated through an induction heating process performed by the induction coil 51. After the induction heating process, the impact beams 1 pass through the cooling unit 60 prior to being finally fed to a desired place by the feed rollers 70.

Figure 2:
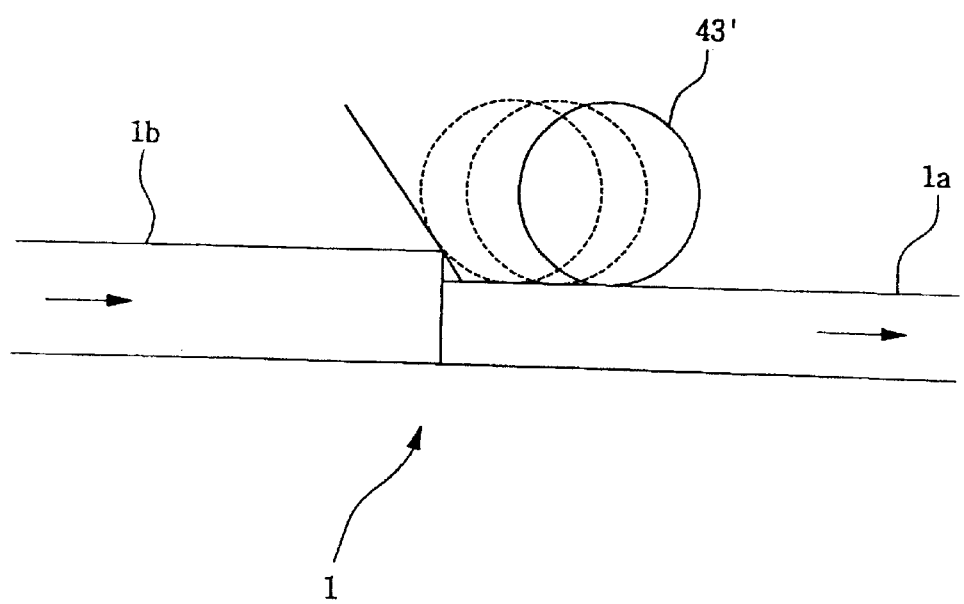
FIG. 2 is an enlarged front view of a heat treatment apparatus for impact beams, showing an impact beam conveying process of the apparatus with impact beams being supported by conventional ball-type support rolls.
Figure 3:
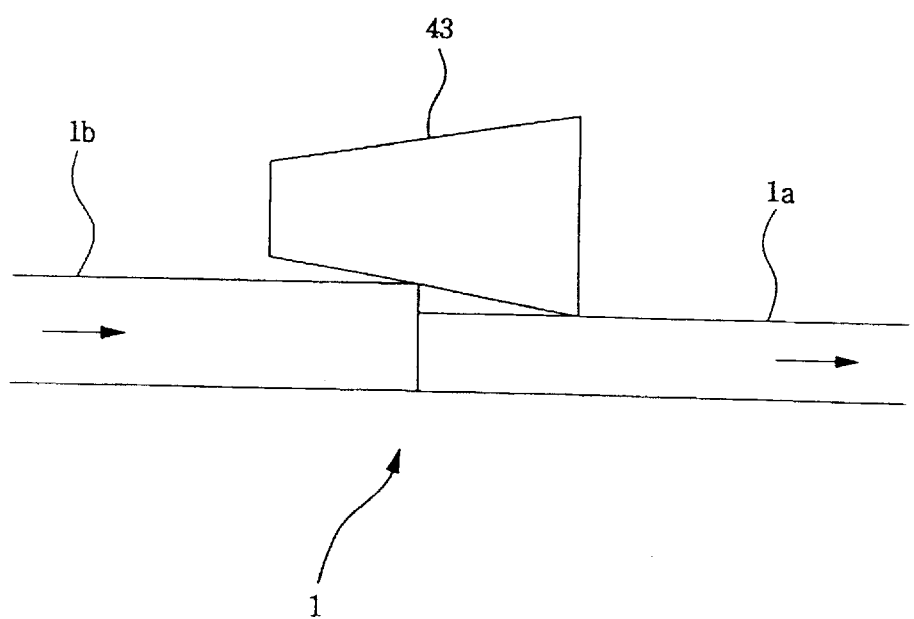
FIG. 3 is an enlarged front view of the heat treatment apparatus of this invention, showing an impact beam conveying process of the apparatus with impact beams being supported by tapered support rolls.
Figure 4:
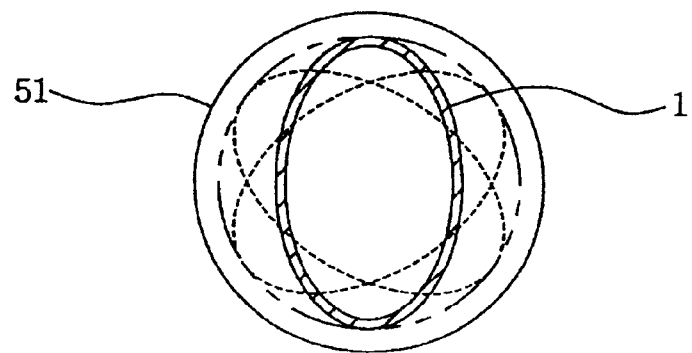
FIG. 4 is a front view, showing a heat treatment process performed by an annular induction coil of the apparatus according to this invention for impact beams having an elliptical cross-section.

In the case of a heat treatment process for hollow impact beams having a non-circular cross-section, such as an elliptical cross-section, the impact beams may be moved from the conveying unit 20 to the impact beam rotating and moving unit 40 under the guide of the guide unit 30 in a way such that a leading beam 1a is horizontally laid along its minor axial surface different from a trailed beam 1b being laid along its major axial surface as shown in FIGS. 2 and 3. When the support rolls, pressurizing the impact beams 1a and 1b toward the rotary drums 41, are ball-type rolls 43' as shown in FIG. 2 or simple cylindrical rolls having a constant diameter, the leading end of the trailed impact beam 1b may be brought into contact with each roll 43' at a large angle or may be caught by the roll 43' after the leading impact beam 1a completely passes under the roll 43'. The trailed impact beam 1b may be thus undesirably stopped or fail to be smoothly moved to the center of the annular induction coil 51.

In order to overcome the above-mentioned problem experienced by the ball-type rolls 43' or by the simple cylindrical rolls, the support rolls 43 of this invention are specifically designed to have a tapered profile. In the case of use of such tapered rolls 43, the apparatus smoothly moves the impact beams 1 to the heat-treating unit 50 regardless of the laid positions of the beams 1. That is, the beams 1 are effectively moved to the heat-treating unit 50 while being smoothly guided by the tapered surface of each roll 43, with the leading end of the trailed impact beam 1b being free from coming into contact with the tapered roll 43 at a large angle or free from being caught by the roll 43 after the leading impact beam 1a completely passes under the roll 43.

In the operation of this apparatus, all the impact beams 1 are precisely guided to the center of the annular induction coil 51 of the heat-treating unit 50 while being rotated and moved by the impact beam rotating and moving unit 40 regardless of the cross-sectional profile of the impact beams 1. Therefore, the impact beams 1 having a r on-circular cross-section, such as an elliptical cross-section, are smoothly moved through the center of the annular induction coil 51 while being continuously rotated, thus being uniformly heated by the coil 51. This finally prevents the impact beams, having a non-circular cross-section, from being undesirably reduced in structural strength in addition to flexural deformation during a heat treatment process.

As described above, the present invention provides an apparatus for heat treatment of impact beams for use in automobiles. The apparatus of this invention is designed to uniformly and effectively heat-treat impact beams having a non-circular cross-section, such as an elliptical cross-section, in addition to impact beams having a circular cross-section. Therefore, this apparatus accomplishes an improvement in quality of such impact beams in addition to an improvement in productivity while producing the impact beams.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for heat treatment of impact beams for use in automobiles, comprising:

a step feeder carrying a plurality of impact beams thereon and orderly and continuously feeding the impact beams toward a conveying unit;

the conveying unit and a guide unit, both being orderly positioned in back of the step feeder and being used for orderly, horizontally and continuously moving and guiding the impact beams from the step feeder in a direction at a constant speed;

an impact beam rotating and moving unit positioned at an outlet end of said guide unit and consisting of a rotary drum and a plurality of support rolls, said rotary drum cooperating with the support rolls to orderly and continuously move the impact beams from the guide unit in the direction, each of said support rolls having a tapered profile; and a heat-treating unit positioned at an outlet end of said impact beam rotating and moving unit, said heat-treating unit being used for heating the impact beams using an annular induction coil while guiding the impact beams from the rotating and moving unit to a center of said induction coil so as to allow the impact beams to pass through the center of the induction coil.

* * * * *